United States Patent [19]
Larkin

[11] Patent Number: 5,980,414
[45] Date of Patent: Nov. 9, 1999

[54] MULTI-RANGE, BELT-TYPE, CONTINUOUSLY VARIABLE TRANSMISSION

[75] Inventor: Robert Francis Larkin, Pittsfield, Mass.

[73] Assignee: General Dynamics Land Systems, Inc., Sterling Heights, Mich.

[21] Appl. No.: 09/059,418

[22] Filed: Apr. 14, 1998

Related U.S. Application Data

[60] Provisional application No. 60/044,322, Apr. 25, 1997.

[51] Int. Cl.⁶ .................................................. F16H 37/02
[52] U.S. Cl. .......................................... 475/211; 475/219
[58] Field of Search .................................... 475/210, 211, 475/219

[56] References Cited

U.S. PATENT DOCUMENTS

| | | | |
|---|---|---|---|
| 3,106,855 | 10/1963 | Reichenbaecher | 475/210 |
| 3,596,535 | 8/1971 | Polak . | |
| 4,644,820 | 2/1987 | Macey et al. | 475/211 |
| 4,754,664 | 7/1988 | Dick . | |
| 5,011,458 | 4/1991 | Kumm | 475/210 X |
| 5,055,094 | 10/1991 | Cataldo | 475/211 |
| 5,730,678 | 3/1998 | Larkin | 475/81 |

FOREIGN PATENT DOCUMENTS

| | | |
|---|---|---|
| 0 003 397 | 8/1979 | European Pat. Off. . |
| 0 147 646 | 7/1985 | European Pat. Off. . |
| 0 347 186 | 12/1989 | European Pat. Off. . |
| 0 541 771 | 5/1993 | European Pat. Off. . |
| 87/06316 | 10/1987 | WIPO . |
| WO 87/06316 | 10/1987 | WIPO . |

OTHER PUBLICATIONS

Company Profile and Product Range, Van Doorne's Transmissie b.v., 11 pages, Nov. 1995.

Vahabzadeh, H., et al., "A Split–Torque, Geared–Neutral Infinitely Variable Transmission Mechanism," 10 pages, undated. (approx 1990).

Bedford, H., et al., "The Lever Analogy—A New Tool in Transmission Analysis," No. 0148–7191/81/ 0223–0102502.50, Copyright 1981, Society of Automotive Engineers, Inc.

*Primary Examiner*—Sherry L. Estremsky
*Attorney, Agent, or Firm*—Finnegan, Henderson, Farabow, Garrett & Dunner, L.L.P.

[57] ABSTRACT

In a multi-range, continuously variable transmission, input engine power is split between a belt-type, continuously variable transmission unit and a system of interconnected planetary gears. This gear system then combines the split power received from the engine and the transmission unit output to produce a transmission output for propelling a vehicle in multiple forward ranges and one reverse range, each range of continuously variable speed produced by stroking the transmission unit. Synchronous shifting between ranges is achieved by selectively clutching or braking elements of the planetary gear sets at appropriate stroke settings of the transmission unit, such that the vehicle may be smoothly accelerated from rest to maximum speed.

13 Claims, 7 Drawing Sheets

| RANGE | STORAGE | OUTPUT SPEED | B1 | B2 | CL1 |
|---|---|---|---|---|---|
| 1 | 124.1%$N_E$ - 62.4%$N_E$ | 0.0$N_E$ - .218$N_E$ | | X | |
| 2 | 62.4%$N_E$ - 211%$N_E$ | .218$N_E$ - .740$N_E$ | X | | |
| 3 | 211%$N_E$ - 45%$N_E$ | .740$N_E$ - 1.33$N_E$ | | | X |
| REV | 124.1%$N_E$ - 210%$N_E$ | 0.0$N_E$ - .305$N_E$ | | X | |
| NEU | | 0.0$N_E$ | | | |

MULTI-RANGE, BELT-TYPE, CONTINUOUSLY VARIABLE TRANSMISSION

The present application claims the benefit under 35 U.S.C. §119(e) of the United States provisional application Ser. No. 60/044,322, filed Apr. 25, 1997.

BACKGROUND OF THE INVENTION

1. Field of the Invention

The present invention relates to a multi-range, belt-type, continuously variable transmission. More particularly, the invention relates to a multi-range, belt-type, continuously variable transmission suitable for application in automotive drivetrains.

2. Description of the Related Art

Over the years, many vehicle transmission systems have been designed to utilize a belt-type continuously variable transmission (belt-type CVT) for multiplying engine torque to accelerate a vehicle from a standing start to a maximum cruising speed. Belt-type CVTs originated with the segmented metal compression belt invention conceived years ago by Dr. Hub Van Doorne of the Netherlands and are currently being applied in light-weight automotive applications. However, most of the belt-type CVTs are single-ratio range transmissions, which are adequate only for vehicles of about 100 kW capacity.

Moreover, belt-type CVTs have other limitations that require added complexity for their adaptation in automotive transmission applications. First, belt-type CVTs cannot provide a transmission neutral, i.e., 0:1 speed ratio, due to their minimum sheave requirements. Therefore, a disconnect device, such as a clutch, must be installed between the engine and the transmission in order to achieve a neutral state. The clutch is then gradually engaged to smoothly accelerate the vehicle from a standing start. Also, a fluid coupling device may be installed between the engine and the belt-type CVT to ensure starting acceleration and, if a torque converter is utilized to increase starting torque.

Secondly, belt-type CVTs have no reverse output capability. Thus, a compound planetary gear set with a ring gear brake is often installed between the engine and the CVT to reverse the input rotation direction to the CVT, thus reversing the CVT output rotation direction. Furthermore, belt-type CVTs generally have a high output speed ratio capability. For example, the output speed ratio of belt-type CVTs can range approximately from 1:0.4 to 1:2.5. However, the maximum speed ratio of transmission output for automobiles rarely exceeds 1:1.5, which is a 0.66:1 overdrive speed ratio. In order to both accommodate and utilize the full output speed ratio potential of belt-type CVTs, an additional speed reduction needs to be applied to the transmission output or to the vehicle final drive for optimum performance.

SUMMARY OF THE INVENTION

The objective of the present invention is to provide an improved automotive transmission that takes advantage of the desirable performance characteristics of a belt-type CVT, while overcoming the limitations thereof, including those noted above. The belt-type CVT of the present invention is a multi-range, belt-type CVT that advantageously provides synchronous, or nearly synchronous, range shifting, together with smooth and uninterrupted power flow from engine to driving wheels to achieve vehicle acceleration from rest to maximum speed. An additional benefit of the transmission of the present invention is that the engine may be continuously operated at or near its most efficient output speed, regardless of transmission output speed.

Additional objectives and advantages of the invention will be set forth in part in the description which follows, and in part will be obvious from the description, or may be learned by practice of the invention. The advantages and purpose of the invention will be realized and attained by the elements and combinations particularly pointed out in the appended claims.

To attain the advantages and in accordance with the purposes of the invention, as embodied and broadly described herein, the invention comprises a multi-range, continuously variable transmission for transmitting power to a driven load from a prime mover. The multi-range, continuously variable transmission comprises an input shaft for connection to receive input power from an engine, an output shaft for connection to deliver output power to a load. A belt-type transmission unit has an input coupled to the input shaft and an output of continuously variable speed ratios produced by stroking the transmission unit between upper and lower speed ratio limits. A gear system includes a first input coupled to the input shaft, a second input coupled to the output of the transmission unit, and output coupled to the output shaft, and a plurality of gear sets for transmitting power flow through the gear system between the first and second inputs and the output. Shift means includes shift elements for selectively acting on gear elements of the gear sets to alter power flow through the gear system and the transmission unit and to shift the transmission between multiple ranges, each capable of producing continuously variable speeds on the output shaft in response to stroking of the transmission unit.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
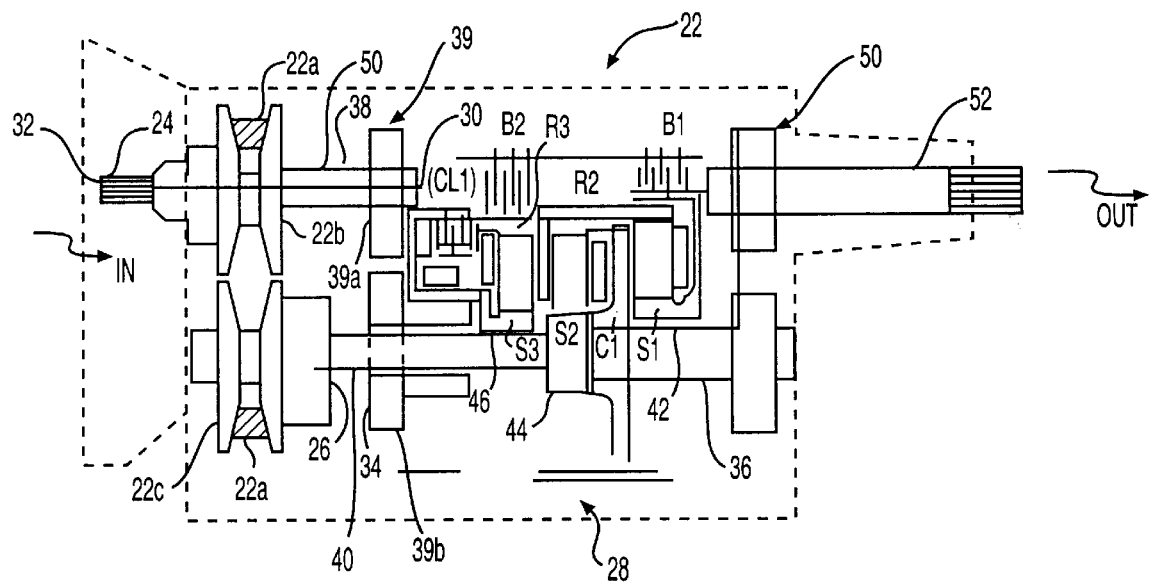
FIG. 1 is a side view of an automotive, multi-range, belt-type CVT according to a preferred embodiment of the present invention.
Figure 2:
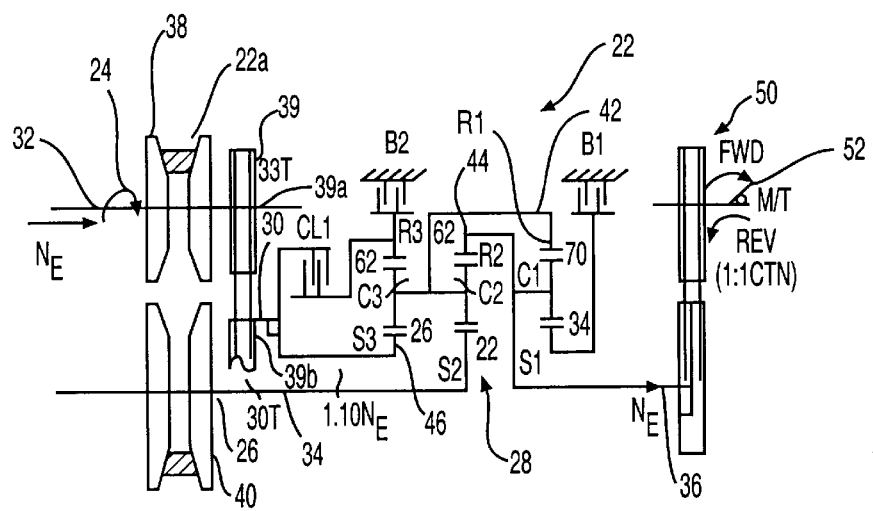
FIG. 2 is a schematic diagram of the CVT of FIG. 1.

In the embodiment of the invention illustrated in FIGS. 1 and 2, a multi-range CVT, generally indicated at 20, includes a belt-type transmission unit 22 having an input 24 driven by a prime mover (not shown), an output 26 and capable of continuously or providing infinitely variable input/unit speed ratios between minimum and maximum ratios. Belt-type transmission unit 22 may be of a conventional design well known in the art and thus its structural details need not be described herein. A power transmitting gear system, generally indicated at 28, includes a first input 30 also driven by the prime mover through an input coupler 39, a second input 34 driven by the output 26 of transmission unit 22, a transmission output 36 for connection to a load (not shown), and a capability of being shifted between at least two forward ranges, each of infinitely variable input-to-output speed ratios produced by varying (stroking) the speed ratio of transmission unit 22. As illustated, transmission output 36 is delivered to an ulimate transmission output shaft 52 through a 1:1 speed ratio output coupler 50. This output couple may comprise a spur gear set, a belt and pulley set, or a chain and sproket set.

Considering FIGS. 1 and 2 in further detail, multi-range CVT 20 of the present invention has a spilit input configuration. A portion of the power applied to transmission input shaft 32 by the prime move flows through belt-type transmission unit 22 and the remainded of this input power plows through power transmitting gear system 28. The prime mover for which transmission 20 is applicable may be any automotive internal combustion engine.

The belt-type transmission unit 22 conventionally includes a belt 22a of a triangular section running between two variable diameter pulleys 22b and 22c. Pulley 22b is fixed on transmission input shaft 38, while pulley 22c is fixed to a shaft 40 on which transmission unit output 26 is produced. The space between halves of each pulley determines the diameter on which belt 22a runs. Thus, input/output speed ratio can be continuously varied by the changing the spacing between pulley halves and the diameter of one or both pulleys. The input/output speed ratio of belt-type transmission unit 22 may range, for example, from 1:0.4 to 1:2.5. Though the belt-type transmission unit 22 cannot achieve a neutral state, i.e. 1:0 unit-input/unit-output speed ratio, it can achieve a relatively high overdrive output speed ratio.

Coupler 39 includes an input drive element 39a driven off of transmission input shaft 38 and an output drive element 39b connected to drive gear system input 30. These drive elements may be intermeshing spur gears, chain interconnected sprockets, or belt interconnected pulleys. In accordance with a feature of the present invention, these drive elements are designed to provide a slight increase in the engine speed Ne, e.g., 1.1 Ne, as applied to gear system input 30.

As illustrated in FIGS. 1 and 2, power transmitting gear system 28 includes three planetary gear sets, generally indicated at 42, 44, and 46. This gear system is similar to the one disclosed in U.S. Pat. No. 5,730,678, entitled "Multi-Range, Hydromechanical Transmission For Motor Vehicles," issued Mar. 24, 1998, the disclosure of which is incorporated herein by reference. The planetary gear sets herein are selectively interconnected in a manner to provide three forward ranges, and one reverse range with synchronous shifting between ranges. By virtue of the present invention, the speed/torque envelope of multi-range CVT 20 can be extended to accommodate starting torque and cruising speed requirements for a variety of automotive drivetrain applications.

Considering gear system 28 in detail, planetary gear set 42 includes a sun gear S1, a planet gear carrier C1 connected to transmission output shaft 36, and a ring gear R1. Planetary gear set 44 also has a ring gear R2 connected to planet gear carrier C1 of planetary gear set 42, a planet gear carrier C2 connected to ring gear R1, and a sun gear S2 connected to transmission unit output 26 on shaft 40. Planetary gear set 46 includes a ring gear R3, a planet gear carrier C3 connected to the ring gear R1 of planetary gear set 42 and to carrier C2 of planetary gear set 44, and a sun gear S3 driven by gear system input 30. Exemplary gear ratios for planetary gear sets 42, 44, and 46 are indicated in FIG. 2.

As further illustrated in FIG. 2, the first planetary gear set 42 has a shifting capability preferably including a brake B1 for selectively grounding sun gear S1, such that carrier C1 may be driven by ring gear R1. A brake B2 selectively grounds ring gear R3 of planetary gear set 46, such that sun gear S3 may drive the interconnected carriers C3, C2 and ring gear R1. Finally, a clutch CL1 is provided to connect the first gear system input 30 to ring gear R3, such that carrier C3 may be driven at input 30 speed.

To facilitate an explanation of the operation of the multi-range CVT 20, the following description takes advantage of the analysis technique described in the article "Lever Analogy—A New Tool In Transmission Analysis," by Benford et al., Society of Automotive Engineers, Pub. No. 810102 (1981). According to this technique, a planetary gear set, at rest, can be analogized by a vertical line (lever), with its sun gear, ring gear, and planet gear carrier represented as points on this line. These points are relatively positioned in accordance with the numbers of sun gear and ring gear teeth, i.e., gear ratio.

Figure 3:
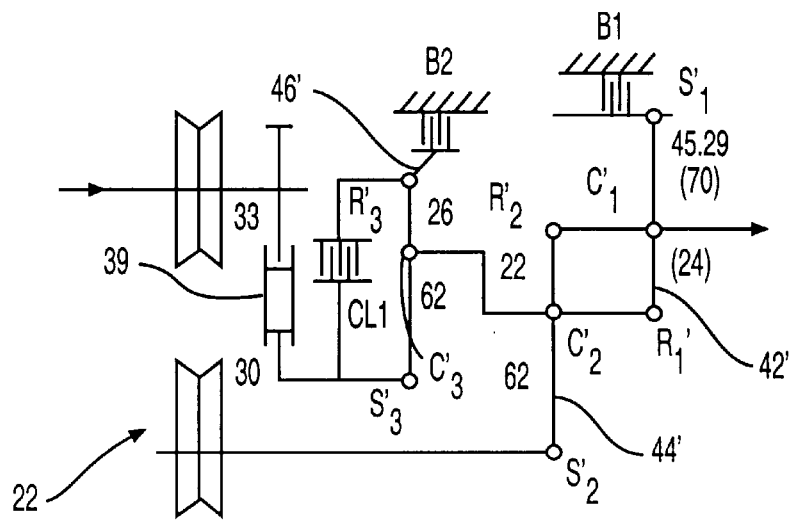
FIG. 3 is a Lever Analogy diagram representing the planetary gear sets utilized inthe CVT of FIG. 1.

FIG. 3 is a graphical representation of the three planetary gear sets 42, 44, and 46 of FIG. 2 as three vertical levers 42', 44', and 46', respectively, in accordance with this Lever Analogy technique. This is an analytical format often utilized for calculations of transmission performance. Also represented in FIG. 3 are the interconnections between gear elements of planetary gear sets 42, 44, and 46. Points S1', C1', and R1' represent sun gear S1, carrier C1, and ring gear R1, respectively, of first planetary gear set 42. Points S2', C2', and R2' represent sun gear S2, carrier C2, and ring gear R2, respectively, of second planetary gear set 44. Finally, points S3', C3', and R3' represent sun gear S3, carrier C3, and ring gear R3, respectively, of third planetary gear set 46.

Figure 4:
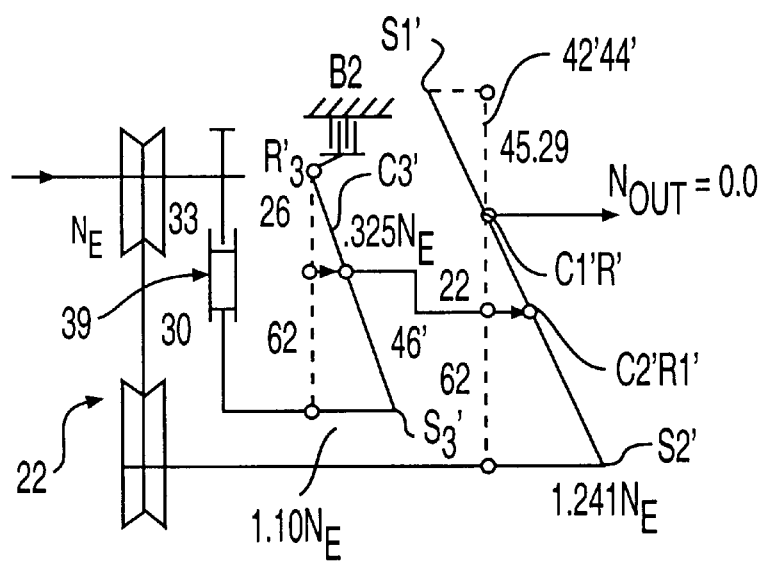
FIG. 4 is a Lever Analogy diagram providing graphic analyses of speed characteristics of the CVT of FIG. 1 at neutral.

FIG. 4 illustrates that, according to the Lever Analogy, the interconnections between the planetary gear sets 42 and 44 permit the graphical representation to be simplified by combining planetary gear sets 42 and 44, such that may be represented by a single lever 42'44'. Point C1'R2' represents planetary carrier C1 and ring gear R2, which are interconnected and thus always have the same speed. Similarly, point C2'R1' represents interconnected planet carrier C2 and the ring gear R1, which always have the same speed. Also, FIG. 4 is an enhancement of the Lever Analogy of FIG. 3 wherein vectors, which represent the speeds of the various transmission components, may be graphically represented as to their magnitude and direction of rotation.

Figures 13, 14:
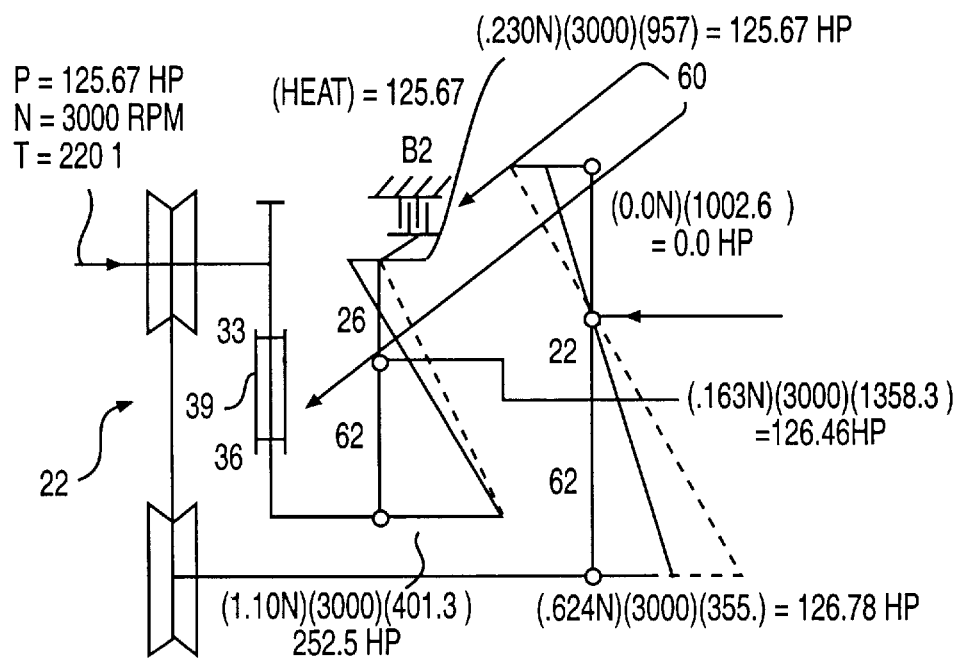
FIG. 13 is a table indicating which of the multiple brakes and clutches are engaged to operate the CVT of FIG. 1 in each of its transmission ranges, together with performance parameters in each transmission range.
FIG. 14 is a Lever Analogy diagram providing graphic analyses of maximum torque and the power capabilities of the CVT of FIG. 1 as applied to a commercially available automotive engine.

As shown in the table of FIG. 13, none of brakes B1, B2 and clutch CL1 is applied to shift transmission 20 into neutral. This neutral is called a "rolling neutral" and is equivalent to the "neutral" gear selector position on conventional automatic transmissions.

As illustrated in FIG. 4, a different type of transmission neutral state can be achieved by engaging brake B1. This neutral is equivalent to an automobile equipped with a conventional automatic transmission with the gear selector in the "drive" position and the brake pedal depressed. Engagement of brake B2 grounds ring gear R3 of planetary gear set 46, such that carrier C3 is driven by sun gear S3. As shown in FIG. 2, sun gear S3 is always driven at 1.10 times engine speed Ne by virtue of coupler 39. As seen in FIG. 4, lever 46' is pivoted in the counterclockwise direction about the braked ring gear pivot point R3' from its vertical orientation to its angular (sloped) orientation seen in FIG. 5 when sun gear S3 is driven at 1.10 Ne. By virtue of the indicated exemplary gear ratio for planetary gear set 46, sun gear S3 drives the planetary carrier C2 at 0.325 Ne when brake B2 is engaged. Carrier C3 drives the planetary carrier C2 and the ring gear R2 at the same speed. Then, by using the indicated exemplary gear ratios for planetary gear sets 42, 44, no output speed will be produced on carrier C1, (and the transmission output 36) regardless of engine speed if the ratio (stroke) of belt-type transmission unit 22 is set to drive sun gear S2 at 1.241 Ne. This will allow variations in engine speed, such as a high idling for engine warm-up, to be accommodated without causing vehicle movement or requiring compensation for slippage within the transmission. Moreover, this neutral state provides a "hill hold" feature in that external forces acting on the vehicle will not cause motion of the vehicle due to the holding force of brake B2. Therefore, two different transmission neutrals can be achieved by engaging or releasing brake B2.

Figure 5:
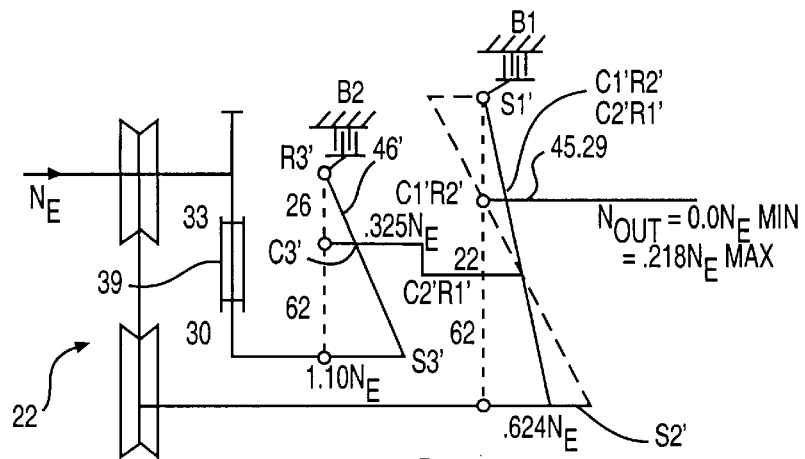
FIG. 5 is a Lever Analogy diagram providing graphic analyses of speed characteristics of the CVT of FIG. 1 in a first forward range.

As illustrated in FIG. 5, when brake B2 is engaged, down-stroking transmission unit 22 to reduce the speed of the sun gear S2 from 1.241 Ne will propel the vehicle in a first forward speed range. This is seen from the fact that the input drive transmitted through carrier C3 to the interconnected carrier C2 and ring gear R1 establishes point C2'R1' as a pivot point about which lever 42'44' is pivoted in the clockwise direction from its dashed line position in FIG. 6 as transmission unit 22 is downstroked to reduce the forward speed on sun gear S2. As a result, the forward speed of carrier C1, ring gear R2, and transmission output shaft 36 increases, as represented by the rightward shift of point C1'R2' seen in FIG. 5.

Figure 6:
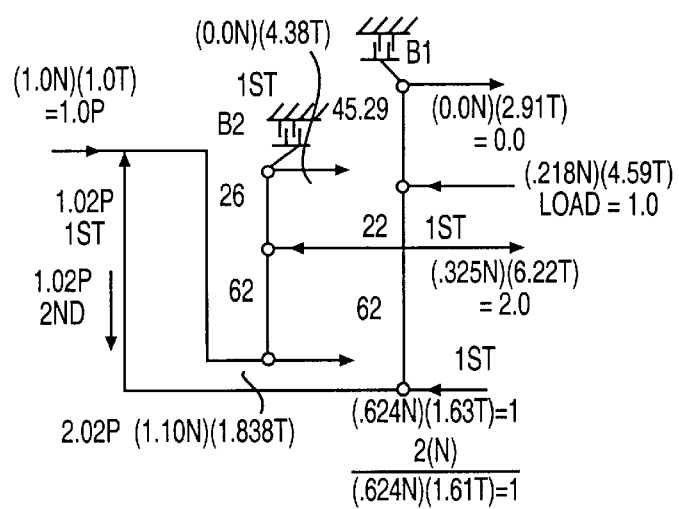
FIG. 6 is a Lever Analogy diagram providing graphic analyses of power flow characteristics of the CVT of FIG. 1 in a first forward range.

When transmission unit 22 is down-stroked to a stroke setting that reduces the speed of sun gear S2 to 0.624 Ne, lever 42'44' will have been pivoted to its solid line orientation, seen in FIG. 6. It is seen that sun gear S1 comes to rest, and the speed of the transmission output 36 achieves a maximum speed of 0.218 Ne in the first forward range.

As shown in FIG. 13, to shift from first forward range into a second forward range, brake B1 is engaged as brake B2 is released. Since sun gear S1 is at rest when B1 is engaged, there is no change in the speeds of any gear elements when shifting between first and second forward ranges; therefore, this is a synchronous shift.

However, in order to achieve a truly synchronous shift, power flows at this range shift point must also remain unaltered. Since power is a function of speed and torque, equalizing speeds at the shift point will not result in a synchronous shift unless the torques are also equalized. Thus, the product of these two parameters must remain unchanged. This is referred to as power match.

Power match at the first to second forward range shift point is shown to be achieved in FIG. 6. The product of speed and torque is equal to power, which can be expressed by the formula, $$(1.0 \text{ N})(1.0 \text{ T}) = 1.0 \text{ P},$$

where N is speed, T is torque, and P is power.

Assuming no internal loss, input power and output power are always, by definition, equal to unity.

As indicated in FIG. 6, output power at the first to second forward range shift point can be preferably expressed by, $$(0.218 \text{ Ne})(4.59 \text{ T}) = 1.0 \text{ P},$$

and is shown as a reaction, i.e., load acting at the point C1'R2'. By taking the sum of the moments acting upon lever 42'44' of the first and second planetary gear set levers 42' and 44' about the point C2'R1', the torque of the sun gear S2 can be calculated to be 1.63 T. Thus, at a speed of 0.624 Ne, power at sun gear S2 is 1.02 P. However, since the torques at transmission output 36 and sun gear S2 are in the same direction, they must be opposed by a torque of equal magnitude and opposite direction at C2'R1', which is shown as a rightward torque 6.22 T in FIG. 6. Because point C2'R1' speed is 0.325 Ne, its power is 2.02 P. Thus, lever 42'44' is in equilibrium.

2.02 P acting at C2'R1' must be reacted by planetary gear set 46. Similarly applying the Lever Analogy to FIG. 6, torque magnitudes and directions of all gear elements are calculated under an equilibrium condition. Sun gear S3 must receive 2.02 P in order to balance the 2.02 P on point C2'R1'. This power is obtained by adding the 1.0 P received directly from the engine and 1.02 P generated by the sun gear S2 and transmitted regeneratively through belt-type transmission unit 22. This power, generated within the CVT 20 by transmission unit 22 may be considered as a regenerative power.

As the CVT 20 shifts from the first to second forward range, the release of the brake B2 and the actuation of the brake B1 are performed concurrently. At the shifting point, input and output parameters of the gear elements remain unchanged. However, because there is no torque reaction available at the brake B2, no power can be generated in planetary gear set 46 and no power is transmitted to point C2'R1'. All input power must, therefore, transfer through belt-type transmission unit 22 to the sun gear S2. By calculating moments about the point S1' on the lever 42'44', the torque and the speed of the sun gear S2 are obtained as 1.61 T and 0.624 Ne, respectively. Similarly, it can be determined that the reaction torque at the sun gear S1 is 2.91 T.

At the first to second forward range shift, the power at the sun gear S2 changes from 1.02 P regenerative to 1.0 P direct. There occurs approximately a 2% power mismatch at the shift point. However, a slight undermatch, as in this case, is usually preferable to an overmatch because internal transmission losses, are usually slightly greater in second forward range. Hence, power undermatch will compensate for such losses. The exact determination of these transient conditions requires careful simulation and may result in changes to the gear ratios to neutralize these loss effects.

In second forward range, CVT 20 output speed on transmission output shaft 36 will increase in proportion to the increase in speed on sun gear S2 as belt-type transmission unit 22 is up-stroked. Thus, second forward range also displays the characteristics of a CVT.

Figure 7:
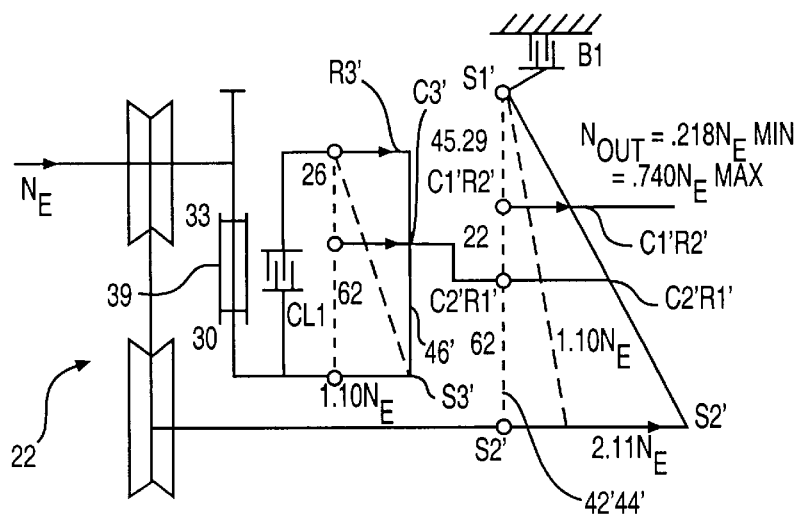
FIG. 7 is a Lever Analogy diagram providing graphic analyses of speed characteristics of the CVT of FIG. 1 in a second forward range.

FIG. 7 is a graphical representation according to the Lever Analogy of transmission in FIG. 2 at the shift point between the second and third forward ranges. With brake B1 engaged to ground sun gear S1, point S1' is established as a pivot point for lever 42'44'. Thus, increasing speed on the sun gear S2 pivots lever 42'44'counter-clockwise about point S1' from its dashed line orientation toward its solid line orientation in FIG. 7. The speed on point C1'R2' increases in proportion to the speed increase on sun gear S2, as will the speed on point C2'R1'. If the maximum speed of sun gear S2 in second forward range is limited to 2.11 Ne, speed at the transmission output shaft 36 will reach 0.740 Ne at the upper end of second forward range by virtue of the ratios of planetary gear sets 42, 44. (solid line orientation of lever 42'44'in FIG. 7) For the same reason, the speed on point C2'R1' is 1.10 Ne. Because brake B2 is released in second forward range, there is no reaction force to the 1.10 Ne input on sun gear S3. However, since carrier C3 is tied to carrier C2 and ring gear R1, it must also spin at 1.10 Ne. Thus, lever 46' assumes the vertical orientation seen in FIG. 7 with ring gear R3 (point R3') also spinning at 1.10 Ne.

As shown in the table of FIG. 13, brake B1 is released as clutch CL1 is engaged to shift transmission 20 into third forward range. It is seen that engagement of clutch CL1 applies the 1.10 Ne input at gear system input 30 to ring gear R3 of planetary gear set 46. Note that the speed of ring gear R3 is 1.10 Ne at the top end of second forward range. Thus, the shift into third forward range is synchronous.

Figure 9:
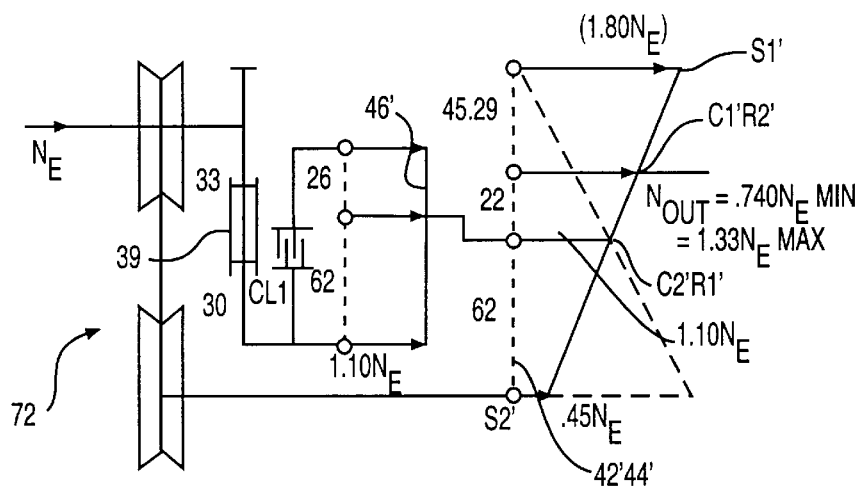
FIG. 9 is a Lever Analogy diagram providing graphic analyses of speed characteristics of the CVT of FIG. 1 in a third forward range.

Since sun gear S3 is also driven at 1.10 Ne, lever 46' is fixed in the vertical orientation seen in FIG. 9 with carrier C3 also driven at 1.10 Ne. This forces the interconnected carrier C2 and ring gear R1 to rotate at 1.10 Ne, thus establishing print C2'R1' on lever 42'44' as a fixed pivot point.

Now, when transmission unit 22 is down-stroked to decrease the speed on sun gear S2 from 2.11 Ne at the upper end of second forward range, lever 42'44' is pivoted about point C2'R1' from its dashed line position toward its solid line position in FIG. 9. The transmission output on shaft 36 is thus accelerated through third forward range to a maximum speed of, for example, 1.33 Ne when the speed on sun gear S2 has been down-stroked to 0.45 Ne.

Figure 8:
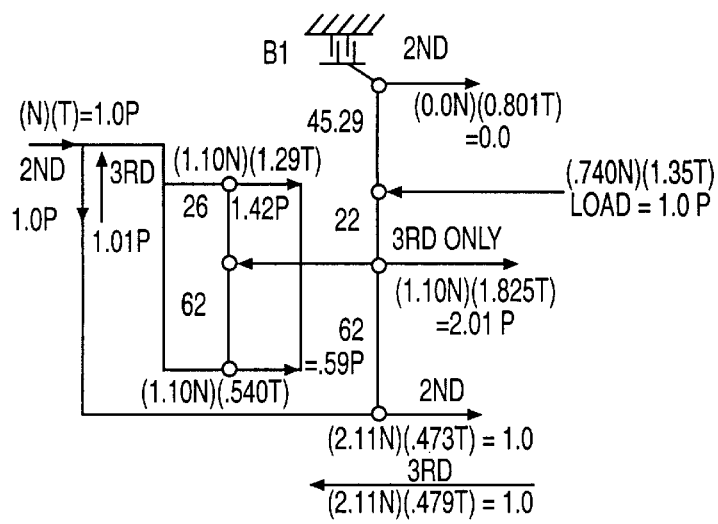
FIG. 8 is a Lever Analogy diagram providing graphic analyses of power flow characteristics of the CVT of FIG. 1 in a second forward range.

As illustrated in FIG. 8, transmission output is expressed as (0.740 N) (1.35 T)=1.0 P, and the power at sun gear S2 as (2.11 N)(0.473 T)=1.0 P In the third forward range, the power at sun gear S3 must reverse direction and become regenerative due to the effect of the power required at the point C1'R2'. However, the regenerative power at the sun gear S2 is (2.11 N)(0.479 T)=1.01 P this represents an approximate 1% power overmatch. However, this slight mismatch will be imperceptible to the driver due to vehicle inertia. Also, planetary gear set 46 transmits 2.01 P by splitting the power proportionally between ring gear R3 and sun gear S3. As graphically illustrated in FIG. 8, all elements in the CVT 20 achieve an equilibrium condition.

Figure 10:
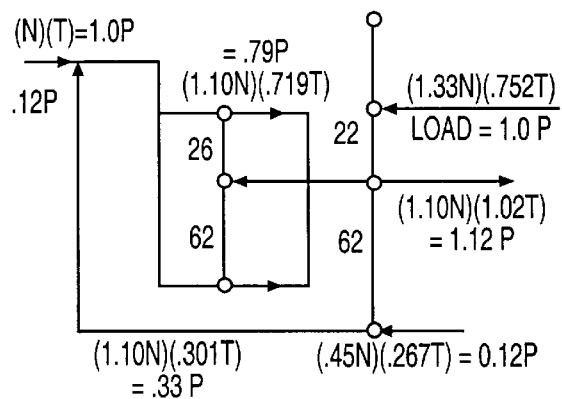
FIG. 10 is a Lever Analogy diagram providing graphic analyses of power flow characteristics of the CVT of FIG. 1 in a third forward range.

A unique feature of a regenerative CVT such as transmission 20 of the present invention is the ability to unload a belt-type transmission unit under certain operational conditions, and this feature is clearly illustrated in FIG. 10. As the transmission output speed increases in third forward range, the regenerative power necessary to balance the transmission system decreases. As shown in FIG. 10, the power generated at sun gear S2 and regeneratively transmitted through belt-type transmission unit 22 decreases to only 0.12 P at the maximum transmission output speed. This low power level reducing stress levels and wear and improves the life cycle of belt-type transmission unit 22, as well as the CVT 20 as a whole. In addition, operation in the higher end of third forward range achieves the maximum overall transmission efficiency, which fortunately coincides with the most common automotive transmission operating condition, i.e., cruising at highway speeds. The capability to decrease power level in transmission unit 22 at cruising speeds is a significant improvement over existing single range belt drive CVTs, which must always transmit 100% of the engine power.

Figure 11:
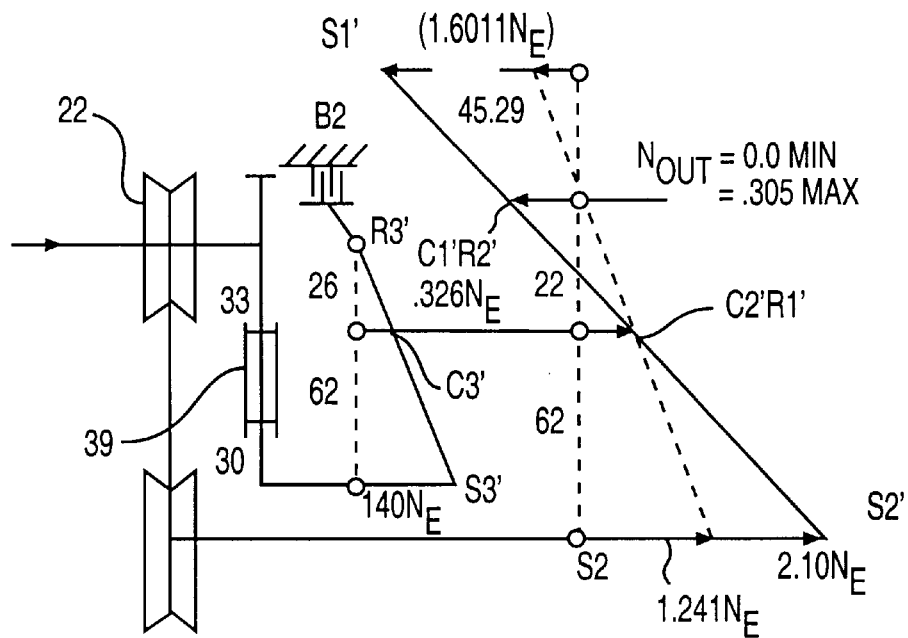
FIG. 11 is a Lever Analogy diagram providing graphic analyses of speed characteristics of the CVT of FIG. 1 in a reverse range.
Figure 12:
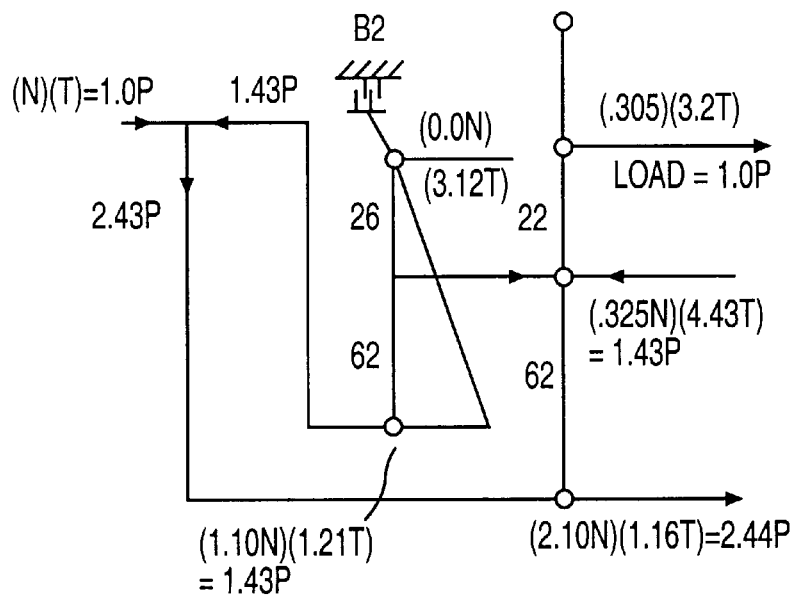
FIG. 12 is a Lever Analogy diagram providing graphic analyses of power flow characteristics of the CVT of FIG. 1 in a reverse range.

FIG. 11 is a graphical representation according to the Lever Analogy of transmission 20 operating in a reverse range. As illustrated in FIG. 13, brake B2 is engaged to shift into reverse range. As previously explained, engagement of brake B2 grounds ring gear R3, and a neutral condition prevails as long as the speed of sun gear S2 is 1.241 Ne. As described above, acceleration through first forward range involves down-stroking transmission unit 22 to decrease the speed on sun gear S2 downwardly from 1.241 Ne. Conversely, acceleration through reverse range involves up-stroking transmission unit 22 to increase the speed on sun gear S2 upwardly from 1.241 Ne. In this case, lever 42'44' is pivoted counter-clockwise about the C1'R2' pivot point from its dashed line position to its solid line position seen in FIG. 11. It is then seen that the transmission output speed appearing at point C2'increases the reverse direction from zero to a maximum speed of 0.305 Ne when the speed on sun gear S2 has been up-stroked from 1.241 Ne to 2.10 Ne.

As in all of the forward ranges, output speed in the reverse range is proportional to the continuously variable speed sun gear S2 and thus is also continuously variable.

As shown in FIG. 13, power flow in reverse range, while regenerative, is different from that in the first or third forward range. The output load reversal at point C1'R2' creates regenerative power at point C2'R1', and this regenerative power is consequently transmitted rack to point C3′, i.e., carrier C3 of planetary gear set 46.

This regenerative power, having maximum magnitude of 1.43 P, is added to the engine power output of 1.0 P and delivered to sun gear S2 through belt-type transmission unit 22 at a magnitude of 2.43 P. This high power flow would appear to exceed the capacity of belt-type transmission unit 22. However, because power is a function of speed and torque, for any given power, torque is inversely related to speed. When the power at sun gear S2 is 2.43 P, torque of sun gear S2 is only 1.16 T because the speed of the sun gear S2 is 2.10 Ne. Since torque capacity is determined by gear tooth strength and the capacity of belt-type transmission unit 22, 2.43 P power can be accommodated CVT 20. In essence, this regenerative power approaches the corner horsepower rating of the belt-type transmission unit 22, i.e., maximum torque capacity times maximum speed capability equals corner horsepower.

Maximum torque is not generated when maximum power of 2.43 P is delivered through the belt-type transmission unit 22. Rather, maximum torque occurs as the transmission unit 22 is stroked away from the engaged neutral state in either forward or reverse direction, as shown in FIG. 4. This results in the output torque being a near infinite in magnitude at very low output speeds. Obviously, this is an unacceptable transmission condition that causes vehicle wheels to spin and poor standing start characteristics. Therefore, it is desirable to provide controlled slippage capability to achieve smooth and predictable vehicle acceleration from rest.

Such a controlled slippage capability may be achieved in transmission 20 by simply modulating the brake B2, i.e., feathering the application of brake B2 as a function of vehicle speed depending upon throttle position. Once the vehicle starts to move, brake B2 can then be fully applied to achieve transmission performance perform as previously described. Therefore, additional belt-type CVT transmission components currently utilized to achieve smooth standing start performance characteristics, such as fluid couplings or magnetic clutches, are not required in transmission 20.

FIG. 14 illustrates the operation of brake B2 as a controlled slippage device. In this extreme condition of maximum stall loading, brake B2 must absorb all of the engine horsepower applied to input shaft 32 and transform it into heat energy. However, more than 1,000 lb-ft of output torque is still available at the transmission output, which is more than adequate for most light weight vehicle applications.

Preferably, modulation of brake B2, as well as transmission unit 22 stroking and range shifting, are all controlled by an electronic controller 60. Controller 60 includes a digital processor that receives signals from various sources such as input speed, output speed, and throttle position sensors. Based on the processing of these signals, controller 60 generates control signals to various actuators (not shown) utilized to stroke transmission unit 22, synchronously range shift, modulate brake B2 during the vehicle start and control transmission lubrication. Based upon vehicle attributes, such as engine capacity and GVW, controller 60 can be tailored to optimize vehicle performance by installing appropriate digital processor software.

Figure 15A:
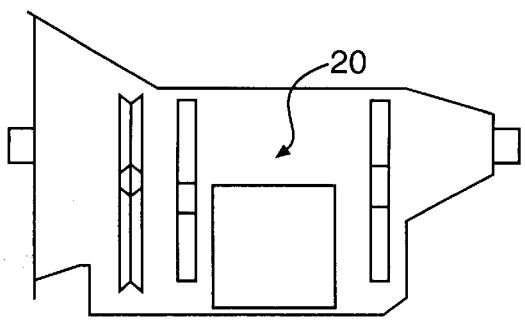
FIG. 15a illustrates a configuration adapting the CVT of FIG. 1 to a well-known automotive drivetrain.
Figure 15B:
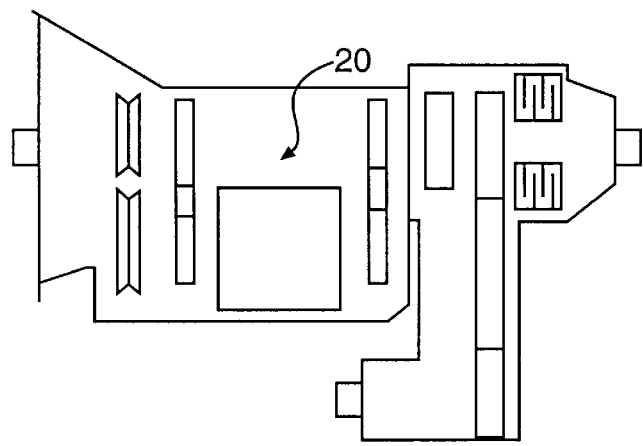
FIG. 15b illustrates a configuration adapting the CVT of FIG. 1 to a well-known automotive drivetrain.
Figure 15C:
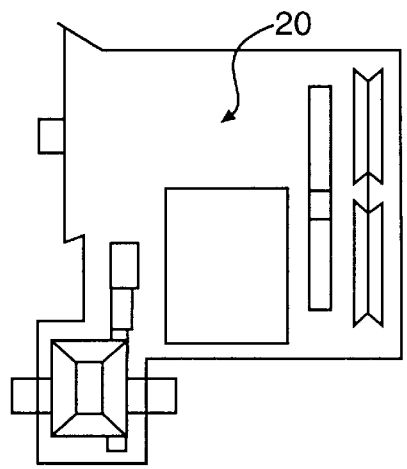
FIG. 15c illustrates a configuration adapting the CVT of FIG. 1 to a well-known automotive drivetrain.

As shown in FIGS. 15a–15c, the multi-range CVT 20 in the present invention can be reconfigured for a variety of motor vehicle applications. FIGS. 15a–15c illustrate three of the most common configurations, rear wheel drive, all wheel drive, and front wheel drive, respectively. The flexibility and performance potential of these transmissions will find many applications.

It will be apparent to those skilled in the art that various modifications and variations, such as specific gear ratios, can be made in the multi-range, belt-type, continuously variable transmission of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A multi-range, continuously variable transmission comprising:

an input shaft for connection to receive input power from an engine;

an output shaft for connection to deliver output power to a load;

a belt transmission unit having an input coupled to the input shaft and an output of continuously variable speed ratios produced by stroking the transmission unit between upper and lower speed ratio limits;

a gear system including a first input coupled to the input shaft, a second input coupled to the output of the transmission unit, and output coupled to the output shaft, and a plurality of gear sets for transmitting power flow through the gear system between the first and second inputs and the output; and shift means to produce continuously variable speeds on the output shaft in response to stroking of the transmission unit within each of at least three forward speed ranges, the shift means including a first shift element for acting on a first gear element to shift into a regenerative cruising speed range, wherein acceleration is achieved by down-stroking the transmission unit toward the lower speed ratio limit.

2. The multi-range, continuously variable transmission of claim 1, wherein the gear sets include plural planetary gear sets.

3. The multi-range, continuously variable transmission of claim 1, wherein the gear system includes first, second and third planetary gear sets.

4. The multi-range, ccontinuously variable transmission of claim 1, wherein the gear sets have gear ratios selected to produce zero drive in the gear system output at a neutral stroke setting of the transmission unit intermediate the upper and lower speed ratio limits.

5. The multi-range, continuously variable transmission of claim 4, wherein the shift means includes a first shift element for acting on a first gear element, such as to produce an increasing forward speed drive on the output shaft when the transmission unit is stroked in one direction away from the neutral stroke setting and an increasingly reverse speed drive on the output shaft when the transmission is stroked in an opposite direction away from the neutral stroke setting.

6. A multi-range, continuously variable transmission comprising:

an input shaft for connection to receive input power from an engine;

an output shaft for connection to deliver output power to a load;

a belt transmission unit having an input coupled to the input shaft and an output of continuously variable speed ratios produced by stroking the transmission unit between upper and lower speed ratio limits;

a gear system including a first input coupled to the input shaft, a second input coupled to the output of the transmission unit, and output coupled to the output shaft, and a plurality of gear sets for transmitting power flow through the gear system between the first and second inputs and the output; and shift means for selectively acting on gear elements of the gear sets to alter power flow through the gear system and the transmission unit and to shift the transmission between multiple ranges, each capable of producing continuously variable speeds on the output shaft in response to stroking of the transmission unit, wherein the plurality of gear sets includes:

a first planetary gear set including a first sun gear, a first planet gear carrier connected to the gear system output, and a first ring gear;

a second planetary gear set including a second sun gear connected to the transmission unit output as the second gear system input, a second planet gear carrier connected to the first ring gear, and a second ring gear connected to the first planet gear carrier; and a third planetary gear set including a third sun gear coupled to the input shaft as the first gear system input, a third planet gear carrier connected to the second planet gear carrier, and a third ring gear.

7. The multi-range, continuously variable transmission of claim 6, wherein the first, second, and third planetary gear sets have gear ratios selected to produce zero drive on the gear system output at a neutral stroke setting of the transmission unit intermediate the upper and lower speed ratio limits.

8. The multi-range, continuously variable transmission of claim 7, wherein the shift means includes a first brake operable to ground the third ring gear, such as to produce a first forward range continuously variable speed drive on the output shaft when the transmission unit is stroked downwardly from the neutral stroke setting toward the lower speed ratio limit and to produce a reverse range continuously variable speed drive on the output shaft when the transmission unit is stroked upwardly from the neutral stroke setting toward the upper speed ratio limit.

9. The multi-range, continuously variable transmission of claim 8, wherein the load is a vehicle, the transmission further comprising a controller for modulating the grounding of the first brake in a manner to produce smooth standing start vehicle acceleration into the first forward and reverse ranges.

10. The multi-range, continuously variable transmission defined in claims 8, further comprising a speed increasing coupler connected between the input shaft and the first input of the gear system.

11. The multi-range, continuously variable transmission of claim 8, wherein the shift means further includes a second brake operable to ground the first sun gear, such as to produce a second forward range continuously variable speed drive on the output shaft when the transmission unit is stroked upwardly from the lower speed ratio limit toward the upper speed ratio limit.

12. The multi-range, continuously variable transmission of claim 11, wherein the shift means further includes a clutch engageable to couple the third ring to the input shaft, such as to produce a third range continuously variable speed drive on the output shaft as the transmission unit is stroked downwardly from the upper speed ratio limit toward the lower speed ratio limit.

13. The multi-range, continuously variable transmission of claim 12, further comprising a controller for coordinating engagements and disengagements of the first and second brakes and the clutch with stroke positions of the transmission unit, such as to achieve synchronous range shifting.

\* \* \* \* \*